US006508051B1

(12) United States Patent
De Angelis

(10) Patent No.: US 6,508,051 B1
(45) Date of Patent: Jan. 21, 2003

(54) SYNTHETIC FIBER ROPE TO BE DRIVEN BY A ROPE SHEAVE

(75) Inventor: Claudio De Angelis, Lucerne (CH)

(73) Assignee: Inventio AG, Hergiswil (CH)

( * ) Notice: Subject to any disclaimer, the term of this patent is extended or adjusted under 35 U.S.C. 154(b) by 3 days.

(21) Appl. No.: 09/591,971

(22) Filed: Jun. 12, 2000

(30) Foreign Application Priority Data

Jun. 11, 1999 (EP) ............................................ 99810512

(51) Int. Cl.[7] ................................................ F16G 1/18
(52) U.S. Cl. ........................................................ 57/223
(58) Field of Search .......................... 57/210, 211, 212, 57/213, 214, 217, 218, 221, 223, 231, 232, 236, 237, 902

(56) References Cited

U.S. PATENT DOCUMENTS 3,618,309 A * 11/1971 Walsh ......................... 57/217
4,227,041 A * 10/1980 Den et al. ............... 174/113 R
4,790,802 A * 12/1988 Onoe et al. ................. 474/260
5,566,786 A 10/1996 De Angelis
5,802,839 A * 9/1998 Van Hook .................. 474/263
6,314,711 B1 * 11/2001 De Angelis .................. 57/210
6,318,504 B1 * 11/2001 De Angelis .................. 269/41

FOREIGN PATENT DOCUMENTS

| | | |
|---|---|---|
| DE | 2 114 278 | 10/1996 |
| EP | 0 672 781 | 9/1995 |
| WO | WO 98/29327 | 7/1998 |

* cited by examiner

*Primary Examiner*—John Calvert
*Assistant Examiner*—Shaun R Hurley
(74) *Attorney, Agent, or Firm*—MacMillan, Sobanski & Todd, LLC

(57) ABSTRACT

A synthetic fiber rope to be driven by a rope sheave is constructed as a twin rope consisting of two ropes with opposite directions of twist which extend parallel to and a fixed distance from each other. The ropes are surrounded by a rope sheath so as not to rotate when the twin rope runs over a rope sheave. The sheave acts as a torque neutralizer which, when the twin rope is loaded longitudinally, mutually offsets the oppositely oriented torques of the ropes which arise due to the structure of the rope, thereby causing over the entire cross-section of the twin rope equalization of the torques from the sum of all the parts having right-hand twist strands and all the parts having left-hand twist strands.

11 Claims, 2 Drawing Sheets

SYNTHETIC FIBER ROPE TO BE DRIVEN BY A ROPE SHEAVE

BACKGROUND OF THE INVENTION

The present invention relates to a synthetic fiber rope, preferably of aromatic polyamide, to be driven by a rope sheave.

In materials handling technology, especially on elevators, in crane construction, and in open-pit mining, moving ropes are an important element of machinery and subject to heavy use. An especially complex aspect is the loading of driven ropes, for example as they are used in elevator construction.

In conventional elevator installations, the car and supporting sling, which are moved in an elevator hoistway, and a counterweight are connected together by several steel stranded ropes. To raise and lower the car and the counterweight, the ropes run over a traction sheave that is driven by a drive motor. The drive torque is transferred by friction to the section of rope which at any moment is lying in the angle of wrap. At this point the ropes are subjected to tensile, bending, pressure, and torsion stresses. The relative movements caused by bending over the rope sheave cause friction within the rope structure which affects rope wear negatively depending on the concentration of lubricant. Depending on the rope construction, radius of bending, groove profile, and rope safety factor the primary and secondary stresses arising have a negative effect on the condition of the rope.

On elevator installations, as well as the strength requirements, considerations of energy lead to the demand for the smallest possible masses. High-tensile synthetic fiber ropes, for example of aromatic polyamides or aramides with highly oriented molecule chains, fulfill these requirements better than steel ropes.

By comparison with conventional steel ropes of the same cross sectional area and same lifting capacity, ropes constructed of aramide fibers have only between one quarter and one fifth of the specific rope weight. In contrast to steel, due to the uniform alignment of the molecular chains, aramide fibers have a substantially lower transverse strength in relation to their longitudinal load-bearing capacity.

For this reason, to minimize the lateral stresses to which the aramide fibers are subjected as they pass over the traction sheave, there is proposed in EP 0 672 781 A1 an aramide fiber stranded rope with suitable parallel lay for use as a driving rope. The aramide rope which has thereby become known affords very satisfactory values in relation to service life, high wear resistance, and fatigue strength under reverse bending stresses; however, under unfavorable conditions with parallel laid aramide ropes, there is the possibility that partial unwinding of the rope occurs, which is permanently detrimental to the original balance of the rope structure. Such unwinding results firstly from the internal torques around the longitudinal axis of the rope which, depending on the load on the rope, generate unwinding of the rope, and secondly from the rope deflections caused externally, for example by the rope running out of alignment over rope pulleys. In this case, dragging of the rope on the flanks of the grooves causes a further change in the structure of the rope. The unwinding causes excessive lengths in the covering layer of strands which are permanently displaced in one direction or the other depending on the direction of rolling. Such occurrences are undesirable because the functionality of the aramide rope can be permanently impaired.

SUMMARY OF THE INVENTION

The present invention concerns a synthetic fiber twin rope to be driven by a rope sheave including: a first load-bearing rope formed of a plurality of synthetic fiber strands able to withstand tension which are twisted in one direction of twist; a second load-bearing rope formed of a plurality of synthetic fiber strands able to withstand tension which are twisted in an opposite direction of twist to the one direction of twist, the second rope being positioned parallel to the first rope at a predetermined distance; and a one piece rope sheath surrounding the first and second ropes to prevent rotation thereof when running over a drive sheave.

The rope according to the present invention has the objective of avoiding the disadvantages of the known synthetic fiber ropes, and proposing a synthetic fiber rope with a construction that is neutral to twisting.

In the twin rope according to the present invention, the rope sheath is formed over aramide fiber ropes and acts as a torque neutralizer. The aramide ropes preferably have an identical rope construction, but the directions of their lays are mirror images of each other, i.e. one rope is right-handed, the other rope is left-handed. This ensures that the opposing torques around the longitudinal rope axis which arise under tension, and when passing over rope sheaves, are mutually compensated by means of the torque neutralizer so that the sum of the torques resulting from the right-hand and left-hand aramide ropes when under load is zero. The external torque acting on the rope as it passes over the traction sheave is neutralized by the external contour of the sheathed twin rope. The former round shape of the rope is now approximately oval, the aramnide rope being preferably twice as wide as high.

The rope construction of each of the twin ropes may then differ from each other if the function of the twin rope in its entirety, meaning the neutralization of the sum of the torques, is given.

The service life of parallel laid strands can be increased if, for example, in the case of two layers laid with parallel lay, the direction of twist of the fibers of the strands of one layer of strands is opposite to the direction of twist of the fibers of strands of the other layer of strands.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
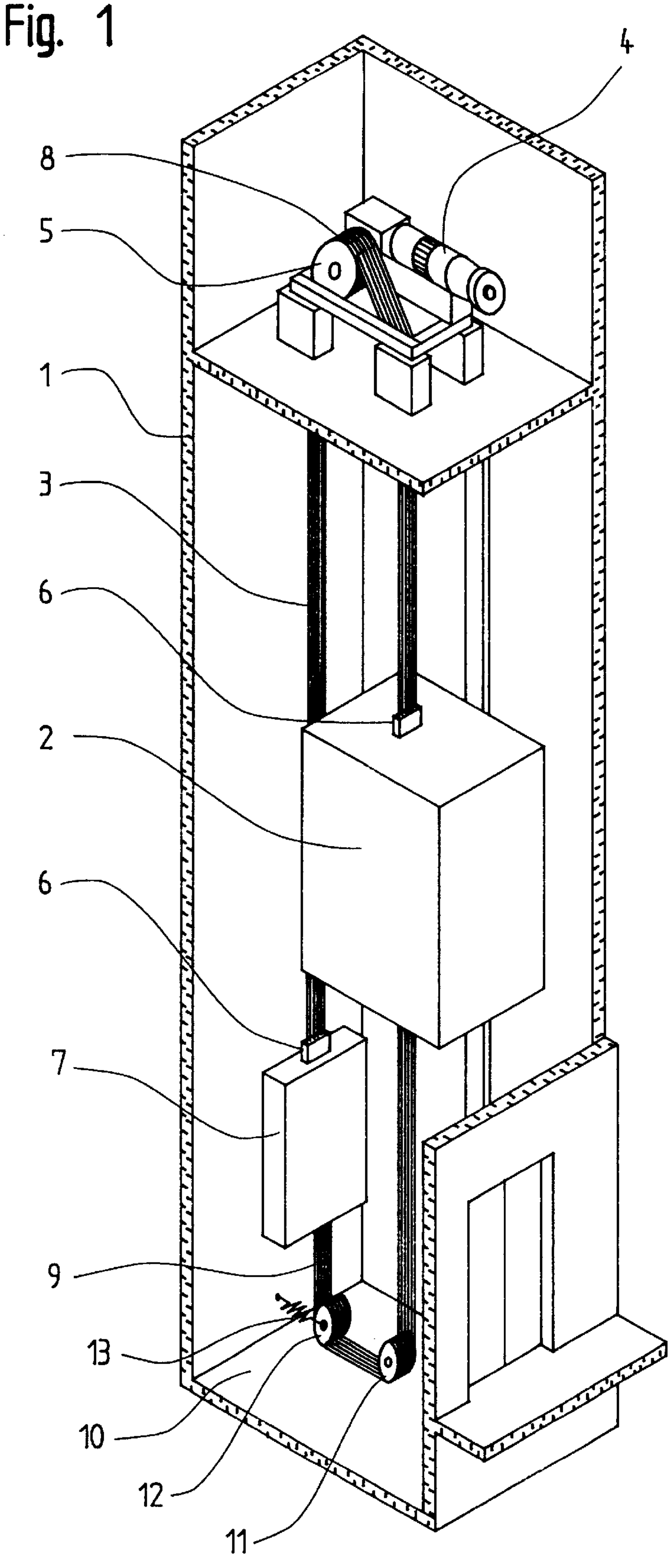
FIG. 1 is a schematic view of an elevator installation with a car connected to a counterweight by synthetic fiber stranded ropes according to the present invention.

As shown in FIG. 1, an elevator car 2 moves in a hoistway 1 and hangs from several, three are shown, load-bearing twin ropes 3 of aramide fibers according to the present invention. The ropes 3 pass over a traction sheave 5 connected to a drive motor 4 positioned at the top of the hoistway 1. On the car 2 are rope end connections 6 to which the twin ropes 3 are fastened with one end. The other end of each of the twin ropes 3 is fastened in the same manner to a counterweight 7, which also moves in the hoistway 1.

Compensating ropes 9 are attached in a similar manner with one end to the underside of the car 2, from where the compensating ropes 9 are guided over a diverter pulley 11 located on the hoistway floor 10 and aligned directly below the point of attachment to the car floor. The ropes 9 are directed over an adjacent diverter pulley 12 also mounted on the hoistway floor 10 and aligned with the underside of the counterweight 7 to which they are linked. Over their entire length between the car 2 and the counterweight 7, the compensating ropes 9 are maintained under tension by means of weights or, as shown here, by means of the pulley 12. Here an extension spring 13, which is anchored to the hoistway wall, pulls the diverter pulley 12 in the direction of the hoistway wall thereby maintaining tension in the compensating ropes 9. Instead of the extension spring, the diverter pulley 12 can be equipped with a suitable linkage arrangement to apply tension to the compensating ropes 9.

In contrast to the elevator installation shown in FIG. 1, due to the use of the twin rope of aramide fiber having reduced specific rope weight, the number of compensating ropes can be reduced or compensation ropes even are not necessary any more. This enables higher maximum travel height and/or larger maximum permissible load for the aramide ropes having identical dimensions compared to conventional steel ropes.

The traction sheave 5 has three double grooves 8 lying close to each other, each of which is for one of the twin ropes 3 according to the present invention as described further below. Until the present time, traction sheaves in elevator construction have usually had two to twelve grooves; correspondingly, when twin ropes 3 according to the present invention are used, traction sheaves can be provided with one to six double grooves 8.

Instead of the layout of a traction drive elevator shown in FIG. 1, the drive 4 and the sheave 5 can be located either on the hoistway floor 10, or on the hoistway wall in the lower part of the elevator hoistway 1 below the car 2 and counterweight 7. The diverter pulleys 11 and 12—or only one diverter pulley—would then be anchored at the upper end of the hoistway 1. The compensating ropes 9 then essentially take over the load-bearing function, and the twin ropes 3 according to the present invention function to raise and lower the car 2 and counterweight 7.

Figure 2:
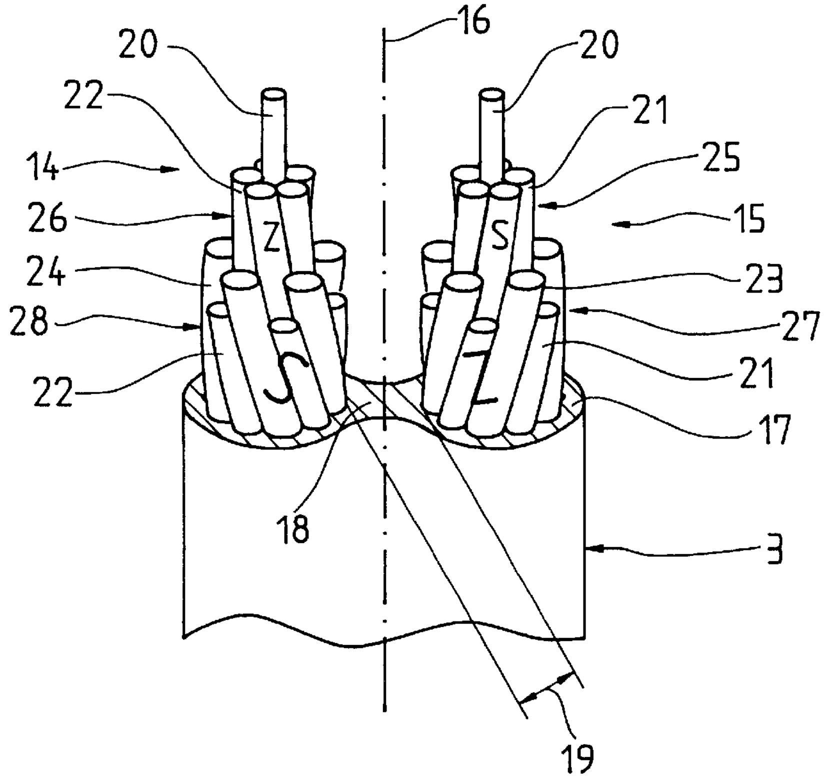
FIG. 2 is a perspective view of a first exemplary embodiment of the twin rope according to the present invention.

FIG. 2 shows the twin rope 3 in its details. The twin rope 3 is built up of two synthetic fiber ropes 14 and 15 arranged parallel to, and at a distance 19 from, each other on opposite sides of a longitudinal axis 16 of the rope. The ropes 14 and 15 are fixed in their position relative to each other, and in particular prevented from twisting, by a rope sheath 17 that surrounds them both and combines them together in the twin rope 3 according to the present invention. The ropes 14 and 15 are twisted ropes manufactured by two-stage laying of rope strands. The rope 14 has a core strand 20 surrounded by a first layer 26 of strands 22. Similarly, the rope 15 has a core strand 20 surrounded by a first layer 25 of strands 21. The rope 14 has a second layer 28 of rope strands 22 and 24 laid together. Similarly, the rope 15 has a second layer 27 of rope strands 21 and 23 laid together. According to the present invention, the two synthetic fiber ropes 14 and 15 differ with respect to their direction of twist, where S indicates a left-handed and Z a right-handed direction of twist.

In the rope 14 rope yarns of aramide fibers with the twist S are laid together to form the strands 22 and 24 with the twist Z. In the first layer of strands 26, five such strands 22 with the twist Z (indicated by the letter "Z" on one of the strands 22 of the first layer 26) are laid with the twist S around the core strand 20. Parallel to these first five strands 22, five strands 24 of greater diameter with the twist Z are laid alternately with five more strands 22 to form the second layer of strands 28. Together they form a twisted, two-layer stranded rope, namely the rope 14 with the twist S (indicated by the letter "S" on the second layer 28).

The construction of the rope 15 is the same as that of the rope 14 except for contrary directions of twist S and Z. Thus, in the rope 15, synthetic fiber rope yarns with the twist Z are twisted into the strands 21 and 23 with the twist S (indicated by the letter "S" on one of the strands 21). These strands 21 and 23 with the twist S are laid in the two layers 25 and 27 to form the rope 15 with the direction of twist Z (indicated by the letter "Z" on the second layer 27).

In the second layer of strands 27 (28), the strands 23 (24) of greater diameter lie in the hollows of the first layer of strands 25 (26) that carries them, whereas the five strands 21 (22) lie on the highest points of the first layer of strands 25 (26) that carries them, thereby filling the gaps between adjacent strands 23 (24) of greater diameter. In this manner, the two layer parallel laid ropes 14 and 15 obtain an almost cylindrical external profile.

Whereas the strands 21, 22, 23 and 24 are laid together with a balanced relationship between the length of lay of fibers and strands, the aramide fiber yarns can be laid with the same or, as in the embodiment shown in FIG. 1, with opposite directions of twist to the strands of the layer 25, 26, 27 and 28 to which they belong. The same direction of twist achieves a better cohesion of the lay of the twin rope 3 in the unloaded state. An increase in the service life can be achieved if the direction of twist of the rope yarns of the first layer of strands 25 and 26 is chosen to be opposite to the direction of twist of the threads of strands 21 and 23 of the second layer of strands 27 and 28, or vice versa.

The directions of twist S and Z, i.e. the helical direction of pitch of the aramide fibers of the rope yarns of a strand 21, 22, 23 and 24 and of the strands in the ropes 14 and 15, are defined in that with the twist S the rope yarns and/or the strands are all laid together in one direction such that lying helically they follow the middle segment of the letter "S"; hence the designation "twist S". For a lay with the twist Z the situation is converse, in that the strands to be laid together also all lie helically uniformly against each other in the direction of the middle segment of the letter "Z" and the lay is therefore designated as "twist Z".

As already mentioned above, the strands 20, 21, 22, 23 and 24 used for the twin rope 3 are twisted from aramide fiber yarns. To protect the fibers, each individual aramide fiber yarn, and also the strands themselves, is treated with an impregnating substance, e.g. polyurethane, polyolefin, or polyvinylchloride. Depending on the desired reverse-bending performance, the proportion of impregnation can lie between 10% and 60%.

The entire external circumference of the ropes 14 and 15 is surrounded by the rope sheath 17 of plastic material such as, for example, rubber, polyurethane, polyolefin, polyvinylchloride, or polyamide. The elastically formable material of whatever sort is sprayed or extruded onto the ropes 14 and 15 and then compressed onto them. The rope sheath material thus penetrates from the exterior into all the interstices between the strands 21, 22, 23 and 24 on the external circumference and fills them. The bonding of the rope sheath 17 to the ropes 14 and 15 thereby formed is so strong that only slight relative movements occur between strands of the ropes and the rope sheath. Furthermore, the single-piece rope sheath 17 formed over both ropes 14 and 15 according to the present invention provides a connecting web 18 bridging the gap between the two regular lay ropes which acts as a torque bridge and mutually eliminates the oppositely-oriented torques in the ropes 14 and 15 caused by the rope construction which arise when the twin rope 3 is loaded longitudinally, and thereby results in neutralization of the torques between the sum of all right-handed and all left-handed strands over the entire cross-section of the twin rope 3 according to the present invention.

Figure 3:
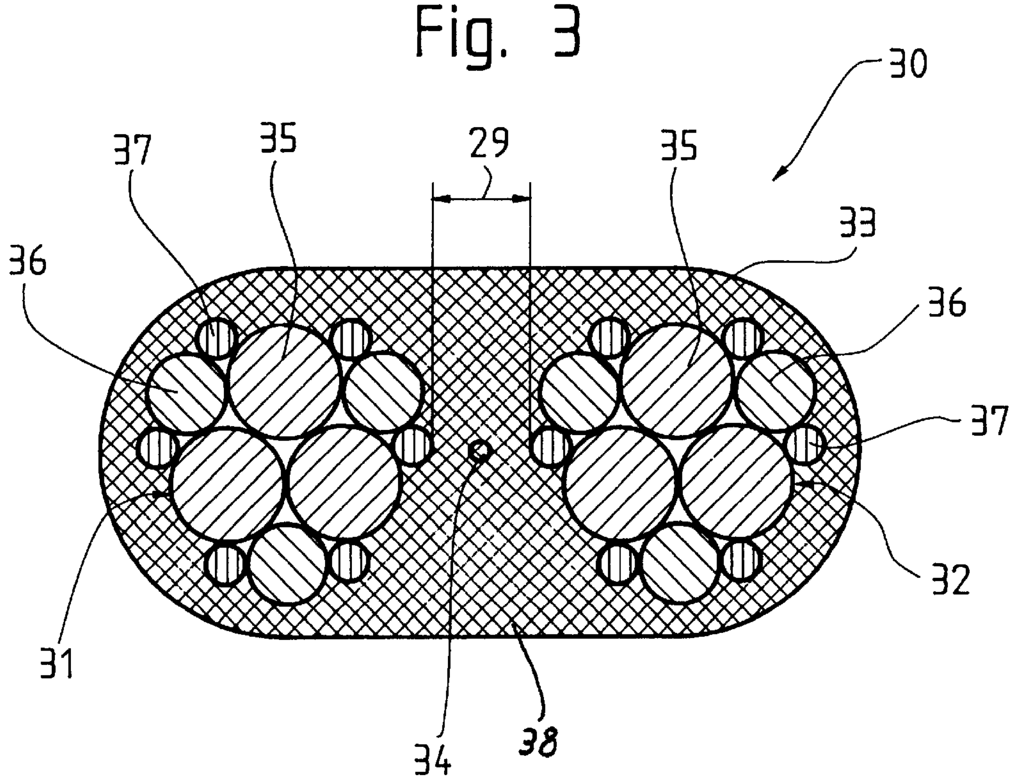
FIG. 3 is a cross-sectional view of a second exemplary embodiment of the twin rope according to the present invention.

The external profile of the rope sheath 17 of the twin rope 3 has the shape of a dumbbell with which to bring about better transmission of force and a constant coefficient of friction with a value greater than 0.18 and a supporting effect by the flanks of the grooves to increase the service life further. The twin ropes can also be used on a cylindrical, oval, concave, rectangular, or wedge-shaped groove. The external profile of the twin ropes 30 shown in FIG. 3 is adapted to correspond to this purpose. For example, a rib formed along the length of the rope acts together with a complementary shape of groove for exactly true running of the twin rope on the rope traction sheave.

In a second exemplary embodiment shown in FIG. 3, the twin rope 30 consists of two ropes 31 and 32 twisted with opposite directions of twist S and Z, which are fixed parallel to, and at a distance from, each other by means of a common rope sheath 33 so as not to rotate. Except for the different directions of twist S and Z of the ropes 31 and 32, the twin rope 30 is constructed symmetrical to a longitudinal axis 34 of the rope with the ropes being spaced a distance 29 apart.

The ropes 31 and 32 each consist of three groups of strands 35, 36 and 37 with different diameters. The number of yarns in all the strands 35, 36 and 37 of the twin rope 30 is the same, and depends on the desired diameter of the ropes 31 and 32 to be made. In the rope 31 of this exemplary embodiment three larger diameter strands 35 of the first group with twist Z are laid into a rope core with twist S. Around this rope core three further strands 36 of intermediate diameter of the second group are laid in parallel lay and lie close against the outer profile of the rope core. Lastly, the interstices between the strands 35 and 36 which are laid together on the outside circumference of rope 31 are filled with smaller diameter strands 37 of the third group. These strands 37 are also laid parallel and helically to the rope 31. The structure of the rope 32 differs from that of the rope 31 solely in the opposite directions of twist S and Z of the aramnide yarns and strands.

In this exemplary embodiment, the rope sheath 33 is formed with a pair of opposed flat sides and surrounds the ropes 31 and 32 on all sides, the width of the twin rope 30 being substantially greater than its thickness. To produce a desired coefficient of friction, the rope sheath 33 is completely, or as here partially in the region of a connecting web 38, coated with suitable materials. As an alternative, or additionally, to produce a desired coefficient of friction, the material of the traction sheave groove liners can be appropriately selected.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A synthetic fiber twin rope to be driven by a rope sheave while supporting a load comprising:

a pair of load-bearing ropes each formed of a predetermined number of strands, each said strand being formed of a plurality of synthetic fibers able to withstand tension, each said rope having one of said strands as a core strand, a first layer of said strands surrounding said core strand and a second layer of said strands surrounding said first layer of said strands;

a first one of said load bearing ropes having said strands twisted in one direction of twist (S) and said fibers of said strands twisted in an opposite direction of twist (Z) to the one direction of twist (S);

a second one of said ropes having said strands twisted in the opposite direction of twist (Z) and said fibers of said strands twisted in the one direction of twist (S), said second rope being positioned parallel to said first rope at a predetermined distance; and a rope sheath surrounding said first and second ropes, said rope sheath being formed from a material bonded to said synthetic fiber strands to prevent rotation thereof when running over a drive sheave.

2. The twin rope according to claim 1 wherein said first and second ropes are equally spaced from a longitudinal axis of said rope sheath.

3. The twin rope according to claim 1 wherein said fibers are aramide fibers lying parallel to each other.

4. The twin rope according to claim 1 wherein said rope sheath has a dumbbell-shaped profile with a connecting web extending between said first second ropes.

5. The twin rope according to claim 1 wherein said rope sheath has a pair of opposed flat sides.

6. The twin rope according to claim 1 wherein said rope sheath is constructed in one piece.

7. A synthetic fiber twin rope to be driven by a rope sheave while supporting a load comprising:

a pair of load-bearing ropes each formed of a predetermined number of strands, each said strand being formed of a plurality of synthetic fibers able to withstand tension, each said rope having a core of larger diameter ones of said strands, a first layer of intermediate diameter ones of said strands surrounding said larger diameter stands and a second layer of smaller diameter ones of said strands surrounding said intermediate diameter strands;

a first one of said load bearing ropes having said strands twisted in one direction of twist (S) and said fibers of said strands twisted in an opposite direction of twist (Z) to the one direction of twist (S);

a second one of said ropes having said strands twisted in the opposite direction of twist (Z) and said fibers of said strands twisted in the one direction of twist (S), said second rope being positioned parallel to said first rope at a predetermined distance; and a rope sheath surrounding said first and second ropes, said rope sheath being formed from a material bonded to said synthetic fiber strands to prevent rotation thereof when running over a drive sheave.

8. The twin rope according to claim 7 wherein said first and second ropes are equally spaced from a longitudinal axis of said rope sheath.

9. The twin rope according to claim 7 wherein said fibers are aramide fibers lying parallel to each other.

10. The twin rope according to claim 7 wherein said rope sheath has a dumbbell-shaped profile with a connecting web extending between said first and second ropes.

11. The twin rope according to claim 7 wherein said rope sheath has a pair of opposed flat sides.

* * * * *